May 12, 1959 R. J. RADCLIFFE 2,885,868
AUTOMOTIVE AIR CONDITIONING SYSTEM WITH HEAT EXCHANGER
Filed Sept. 10, 1956
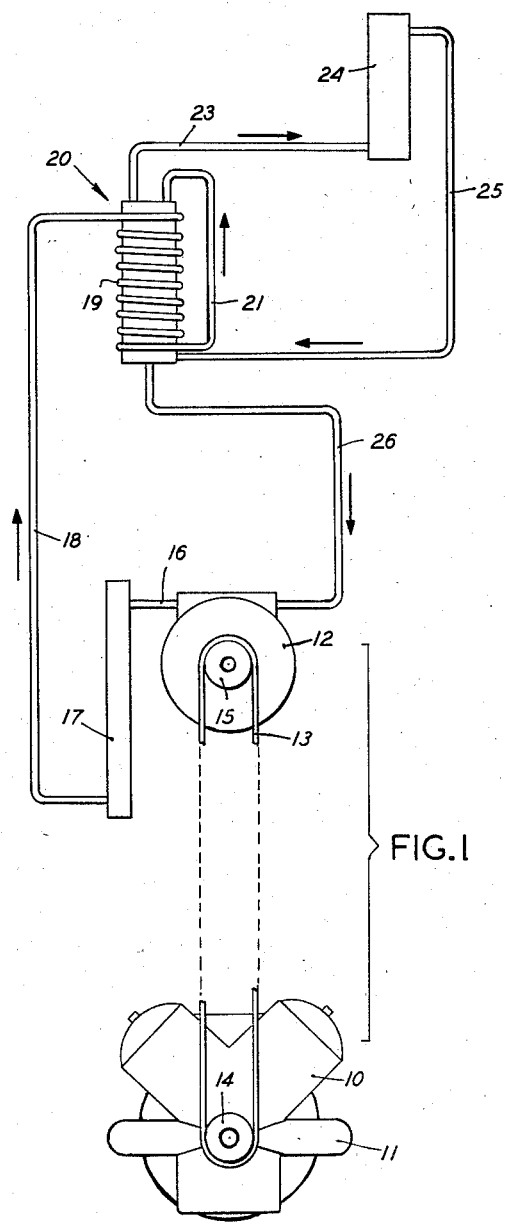
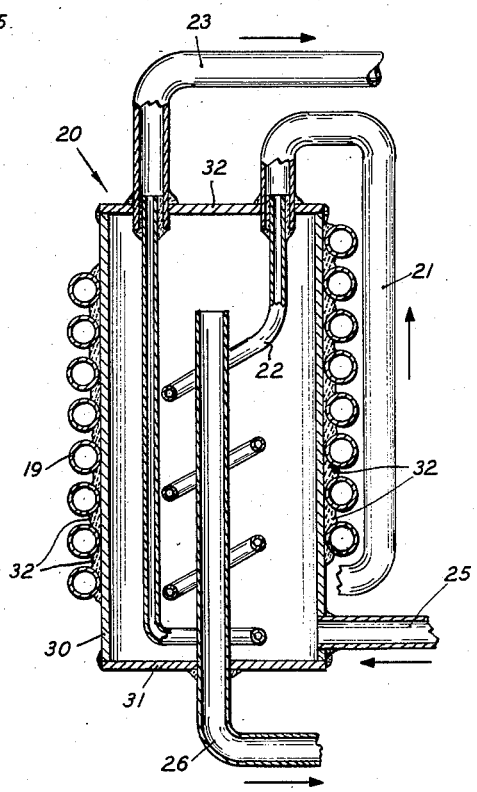
INVENTOR.
RICHARD J. RADCLIFFE
BY
Buckhorn, Cheatham & Blore
ATTORNEYS

United States Patent Office 2,885,868
Patented May 12, 1959

2,885,868

AUTOMOTIVE AIR CONDITIONING SYSTEM WITH HEAT EXCHANGER

Richard J. Radcliffe, Wichita, Kans., assignor to The O. A. Sutton Corporation, Wichita, Kans., a corporation of Kansas Application September 10, 1956, Serial No. 608,882

2 Claims. (Cl. 62—511)

My present invention relates to refrigerating systems of the compressor-condenser-expander type, of particular utility in automotive air conditioning systems. Such systems are difficult to control, since a number of variable factors must be accounted for. First of all, the compressor, unless it is powered by an auxiliary power plant, which is extremely expensive, and often too bulky, operates at a speed dependent upon the speed of the automotive engine. This speed ranges from the idling speed of the engine when the vehicle is arrested to the top speed achieved by the engine in propelling the vehicle. Therefore, the refrigerant pumping capacity of the compressor is related to the engine speed, or the forward speed of the vehicle. Secondly, the condenser, which is most practically a finned coil and is most practically located in the air stream utilized to cool the engine, is subjected to extremely variable ambient temperatures. In some sections of the world, the ambient temperature may vary, in a one-hour drive, from approximately 32° F. to approximately 100° F., for example, in descending from the crest of the Cascade Mountains to the bottom of the Deschutes River valley in Oregon. Therefore, the capacity of the condenser, while it is affected by the vehicle's speed, and to some extent by the speed of the engine, is largely determined by the ambient temperature which may vary within extremely wide limits. And thirdly, the evaporator, which is most practically a finned coil evaporator, is not only affected by the variable ambient temperature, but also by the heat absorbing ability of the vehicle's surface, the number of occupants of the vehicle, the humidity of the atmosphere, the vehicle's speed, and the amount of air permitted to flow through the interior of the vehicle. For example, a tightly closed, black vehicle which has been parked in direct sunlight for a long period of time at sea level may be unbearably hot, whereas the same vehicle on the same day, moving rapidly through a shady forest on a mountain top, may be unbearably cold. My present invention is to provide a refrigerating system and control means therefor which offers many advantages in simplicity and improved results. The system is such that any change in the conditions to which any portion of the system is subjected has the least possible effect upon the cooling efficiency of the system.

It is well known that a refrigerant system using a capillary restrictor offers many advantages in simplicity and low maintenance cost. A system of this type applied to an automotive application has generally proven to be unsatisfactory in operation, and most automotive systems have embodied expensive and complicated compensating control means. The principal object of the present invention is to make possible the utilization of the capillary restrictor in automotive air conditioning systems by so modulating the actual restrictive effect of the capillary tube as to compensate for speed and ambient temperature changes as well as refrigerating load.

The objects and advantages of the present invention will be more readily understood by referring to the accompanying drawings, taken in connection with the following specification wherein like numerals refer to like parts throughout. The operation of the system is more exactly described and explained in the specification.

In the drawings Fig. 1 is a schematic representation of the present invention in an automotive application; and Fig. 2 is a vertical, central section through the control means of the present invention.

In Fig. 1 an automotive internal combustion engine 10 is illustrated, the engine being that engine which drives the automobile, tractor, railway coach, bus or other vehicle involved. Such engines are located so as to have a cooling air stream induced by the forward motion of the vehicle flow across the engine, usually the air stream being increased by a fan 11 driven by the engine. It is convenient to mount a refrigerant compressor 12 on or near the engine and to drive the compressor through means connecting it operatively to the engine, such as a belt 13 passing about a pulley 14 on the fan shaft and a pulley 15 on the compressor crankshaft. The hot, compressed refrigerant gas is discharged through a discharge tube 16 into a condenser 17, preferably of the finned coil type and preferably located in the incoming air stream ahead of the fan 11, wherein the refrigerant is cooled and condensed into a saturated vapor and liquid, or sub-cooled liquid, depending a great deal upon the ambient air temperature and the vehicle's speed. The refrigerant then passes through a liquid tube 18 into a liquid receiver 19, in the form of a coil of the liquid tube, which is wrapped closely about the shell of an accumulator 20 forming the nucleus of the control means of the system, the liquid entering the coil at the top and traveling down to the bottom of the coil. A short tube 21 leads from the bottom of the coil into the top of the accumulator 20. A capillary restrictor 22 is connected to the end of the tube 21 and is coiled within the accumulator 20, the coil leading down to a point adjacent the bottom of the accumulator and the outlet end of the capillary restrictor being sealed into the end of an evaporator inlet tube 23 which leads from the top of the accumulator to the bottom of the evaporator 24. The evaporator 24 is preferably a finned coil and is associated with air moving means (not shown) whereby air to be conditioned in the occupied space is moved in heat exchange relation with the expanding refrigerant. The expander is located within the load compartment, such as the tonneau of an automobile, the interior of a bus, the cab of a tractor, or other similar space subjected to variable ambient temperatures, sun loading and occupancy. An evaporator suction tube 25 leads from the top of the evaporator back to the bottom of the accumulator. The warmed refrigerant, which has picked up heat from the treated air, is usually in gaseous form but may have slugs of liquid carried along therewith. The refrigerant passes into the bottom of the accumulator wherein any liquid slugs expand to form a liquid-free gas. The gas leaves the accumulator through a compressor suction tube 26 which enters the accumulator at the center of its bottom and extends upwardly within the capillary coil to a point near the top of the interior of the accumulator, and which returns the gas to the suction inlet of the compressor 12.

The accumulator shell may be conveniently made by brazing a short length of large diameter copper pipe 30 to a lower end cap 31 and an upper end cap 32. The tube 26 is first brazed to the cap 31, and the cap 32 is first brazed to the end of the tubes 21 and 23 and the ends of the capillary tube 22 brazed into the ends of the tubes 21 and 23. When the cap 32 is assembled with the shell 30, the coil 19 slips over the exterior thereof and the capillary tube 22 is lowered into the interior thereof. The coil 19 is maintained in thermally conductive relation with the pipe 30 by interposing suitable conductive means therebetween, as indicated at 32. The conductive means may be solder or other metal uniting alloy, or a substance such as Permagum which is a sticky binder loaded with a metal powder or particles of good conductivity, such as aluminum or copper. The accumulator and the coils thereon are preferably wrapped within batts of insulating material (not shown).

The operation of the control device is based upon several phenomena, as follows:

(1) The capacity of a refrigeration compressor increases with rotational speed, and in an automotive application the capacity may be said to be a function of the forward speed of the vehicle.

(2) The heat load impressed upon an automotive vehicle is not a direct function of forward speed. Therefore, if the refrigerating effect produced at 45 miles per hour, for example, is adequate, than for all practical purposes it will also be adequate for a forward speed of 75 miles per hour.

(3) The effective restriction to refrigerant flow offered by a capillary tube metering device is dependent upon the quality (that is, the ratio of liquid to vapor) of the refrigerant within the capillary tube throughout its length.

(4) The quality of the liquid within the capillary tube at any instant is determined by the enthalpy of the refrigerant entering the restrictor tube, and the saturated liquid enthalpy of the refrigerant leaving the restrictor tube.

It is logical to conclude from the foregoing premises that effective control of the rate of refrigerant through a capillary tube could be accomplished with any suitable means for regulating the quality of the refrigerant, and that such a means exists if the excess in refrigerating effect produced at any time above the design maximum is used to control the quality of the refrigerant in the restrictor tube. Another conclusion is that if variations in condenser load are compensated for by heat exchange between the condensate from the condenser and the refrigerant returning from the evaporator, the restrictor performance may be controlled in accordance with ambient conditions existing both within the vehicle and outside of the vehicle.

Other factors are involved as follows: In an automotive application the refrigeration system must be designed to be capable of reducing the temperature within the vehicle rapidly under any conditions. For example, an automobile which has been closed and parked in the sunlight for a considerable time may have an interior temperature in excess of 110° F., which the owner wishes to reduce to a comfortable level in a few minutes. A standard capillary tube under such conditions is incapable of flooding the entire evaporator with refrigerant, consequently the time required to lower the temperature to comfortable level is quite lengthy. In the present invention the liquid within the coil 19 is sub-cooled, or at least more liquid will be formed if the condenser delivers a mixture of gas and liquid, by heat exchange with the evaporated refrigerant returned to the interior of the accumulator. The refrigerant returning through the tube 25 may vary from a probable maximum of 75 percent liquid to super-heated vapor, depending upon the heat transfer effected in the evaporator. Within the accumulator a secondary heat transfer process occurs from the expanded refrigerant to the liquid, both within the coil 19 and throughout the length of the capillary tube 22. The restriction offered by the tube 22, being dependent upon the percentage of liquid to vapor of the refrigerant entering and leaving (or throughout the entire length of the restrictor tube), will be at a maximum during periods of high evaporator loading. Therefore, the percentage of the evaporator flooded by this system is maintained at a maximum, and a maximum amount of refrigerant is expanded within the accumulator. This is a self-compensating effect which automatically results in the most rapid cooling of the occupied space from a high temperature to the design temperature, and automatically tends to maintain the design temperature. Stated in other terms, if the temperature in the occupied space is quite high, the evaporator will have a greater amount of active heat exchange surface used more efficiently, the quantity of liquid returned to the accumulator will be reduced, the heat exchange from the low pressure vapor in the accumulator to the liquid in the restrictor coil will be at a minimum, and the heat exchange rate from the receiver coil 19 to the accumulator will be at a maximum, the net result being to increase the restrictive effect of the capillary tube and thus prevent extremely high evaporating temperatures.

One of the additional problems in automotive air conditioning is that of experiencing extremely high head pressures when the engine is idling, a commonly encountered result with ordinary capillary tube restrictors. High head pressures are caused by the reduced air flow across the condenser and the subsequent lowering of the heat ejecting capacity of the condenser. With the present invention high head pressure will push a greater quantity of liquid through the evaporator and into the accumulator. When this takes place the restrictive effect of the capillary tube is greatly decreased due to the available heat exchange taking place. This decrease in restriction allows the head pressure to assume a much lower level, and the head pressure will stabilize at a much lower value.

An additional advantage of the present invention is that the air flow across the evaporator may be reduced, or stopped entirely, without having a detrimental quantity of ice form on the evaporator coil, or a detrimental quantity of liquid returned to the compressor. When the air flow across the evaporator is stopped, the system returns a large quantity of liquid to the accumulator. This in turn decreases the restrictive effect of the capillary tube restrictor, which allows even more liquid to be returned. The receiver coil 19 then acts as the heat load and causes the liquid in the accumulator to be vaporized before returning to the compressor. This allows the capacity of the system within the passenger space to be controlled by the evaporator fan speed alone, without additional mechanical control devices. It also enables the system to be shut off by stopping air flow across the evaporator without damaging the compressor due to liquid return. Since the receiver 19, the accumulator 20, and the capillary tube 22 are all in heat exchange with one another, the accumulator control mechanism is able to modulate the flow by sensing the loading of both the condenser and the evaporator. The condenser load will govern the amount of liquid, saturated vapor, or super-heated vapor presented to the receiver coil and thus control the amount of heat transmitted to the accumulator. The evaporator load will govern the quantity of liquid returned to the accumulator. Consequently, the system is able to modulate the flow to compensate for changes in vehicle speed because such changes will affect both the evaporator and the condenser pressures.

Having illustrated and described a preferred embodiment of my invention, I claim as my invention all such modifications in detail and arrangement thereof as come within the true scope of the following claims:

1. A compressor-condenser-evaporator refrigerating system particularly suitable for air conditioning automotive equipment wherein the compressor operates at a variable speed, the condenser is subject to variable ambient temperature and the evaporator is subjected to a variable load, comprising an accumulator consisting of a thermally conductive shell, a receiver receiving condensed refrigerant from said condenser and comprising a receiver coil wrapped closely about said shell, a capillary restrictor coiled within said accumulator, an evaporator inlet tube leading from said accumulator to the evaporator, one end of said capillary restrictor receiving refrigerant from the outlet of said receiver coil and the other end of said capillary restrictor leading refrigerant into said evaporator inlet tube, an evaporator suction tube leading from said evaporator to the bottom of said accumulator, a compressor suction tube leading from the top of said accumulator to said compressor, and means conducting compressed refrigerant from said compressor to said condenser.

2. In a compressor-condenser-evaporator refrigerating system particularly suitable for air conditioning automotive equipment wherein the compressor operates at a variable speed, the condenser is subject to variable ambient temperature and the evaporator is subjected to a variable load, control means comprising an accumulator consisting of a thermally conductive shell, a receiver coil wrapped closely about said shell from top to bottom thereof, means joining said shell and receiver coil in thermally conductive relation, a short tube leading refrigerant from the bottom of said coil to the top of said accumulator, a capillary restrictor coiled within said accumulator in spaced relation to said shell, an evaporator inlet tube leading from said accumulator reservoir to the evaporator, one end of said capillary restrictor receiving refrigerant from said short tube and the other end of said capillary restrictor leading refrigerant into said evaporator inlet tube, an evaporator suction tube leading from said evaporator to the bottom of said accumulator, and a compressor suction tube leading from the top of said accumulator to said compressor.

References Cited in the file of this patent
UNITED STATES PATENTS

| | | |
|---|---|---|
| 2,188,893 | Philipp | Jan. 30, 1940 |
| 2,510,881 | Gerteis | June 6, 1950 |
| 2,699,043 | Kramer | Jan. 11, 1955 |